US005095409A

United States Patent [19]

Dematteo et al.

[11] Patent Number: 5,095,409

[45] Date of Patent: Mar. 10, 1992

[54] BACKLIT CONTROL ACTUATOR

[75] Inventors: Raymond Dematteo, 54 Revere Dr., South Barrington, Ill. 60010; Ronald Bauer, Buffalo Grove, Ill.

[73] Assignee: Raymond Dematteo, South Barrington, Ill.

[21] Appl. No.: 539,862

[22] Filed: Jun. 18, 1990

[51] Int. Cl.[5] .............................................. G01D 11/28

[52] U.S. Cl. ........................................ 362/23; 362/29; 362/95; 200/315; 200/333; 116/286

[58] Field of Search ....................... 362/95, 23, 26, 27, 362/28, 29, 30, 31, 85; 116/263, 286, 287, DIG. 5, DIG. 28; 200/313, 315, 333, 339

[56] References Cited

U.S. PATENT DOCUMENTS

| | | | |
|---|---|---|---|
| 2,109,790 | 3/1938 | Batcheller | 362/95 |
| 3,053,337 | 9/1962 | Proharka et al. | 362/23 |
| 3,296,404 | 1/1967 | Stevens | 200/333 |
| 4,012,632 | 3/1977 | Stone | 362/23 |
| 4,172,973 | 10/1979 | Sano | 200/315 |
| 4,480,292 | 10/1984 | Schuder | 362/95 |
| 4,501,936 | 2/1985 | Morse | 200/333 |
| 4,710,858 | 12/1987 | Van Hout et al. | 200/315 |
| 4,807,091 | 2/1989 | Obata | 362/30 |
| 4,811,175 | 3/1989 | Desmet | 362/95 |
| 4,868,384 | 9/1989 | Franken et al. | 362/95 |

FOREIGN PATENT DOCUMENTS

| | | | |
|---|---|---|---|
| 1490910 | 6/1969 | Fed. Rep. of Germany | 200/315 |

*Primary Examiner*—Ira S. Lazarus
*Assistant Examiner*—D. M. Cox
*Attorney, Agent, or Firm*—Welsh & Katz, Ltd.

[57] ABSTRACT

A backlit control actuator includes a substrate of translucent material having a front surface with a three-dimensional symbol integrally formed thereon, and a boot of opaque, relatively soft material which is molded around the substrate so that an upper surface of the symbol is flush with an outer surface of the outer covering to permit light transmitted from the control device to backlight the symbol.

14 Claims, 1 Drawing Sheet

Fig-1-
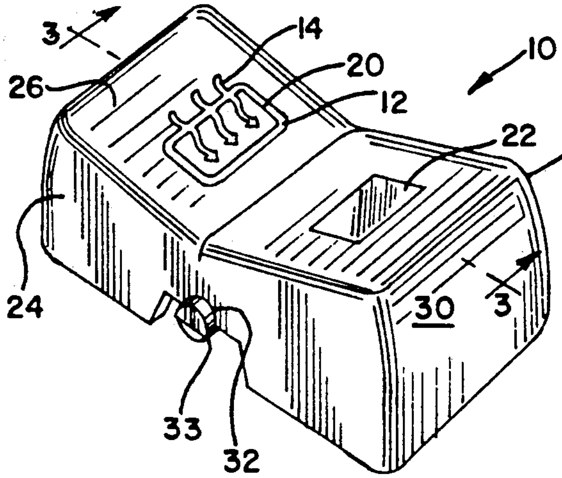
Fig-2-
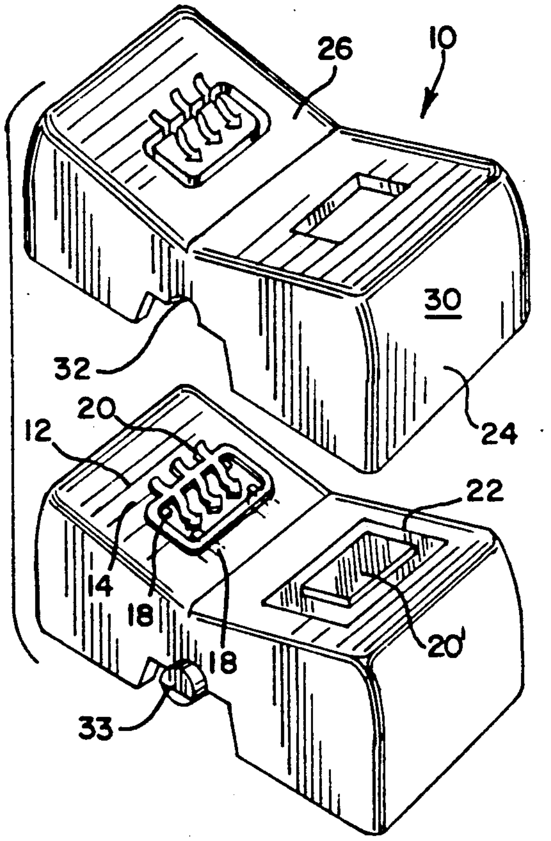
Fig-3-
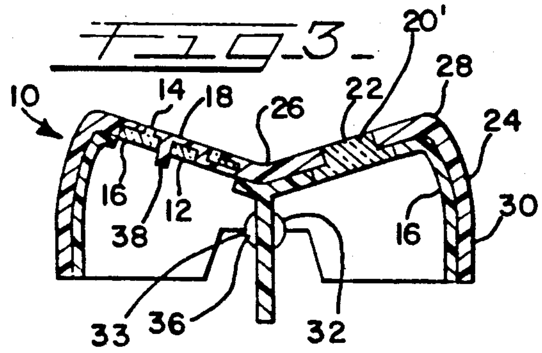
Fig-4-
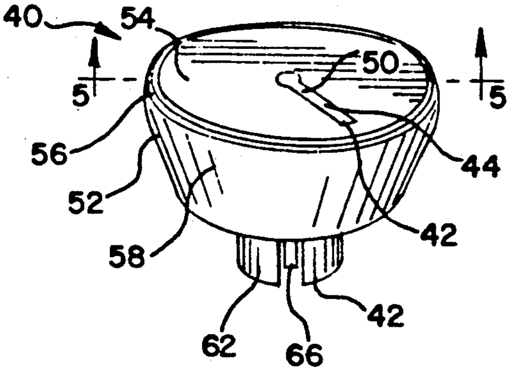
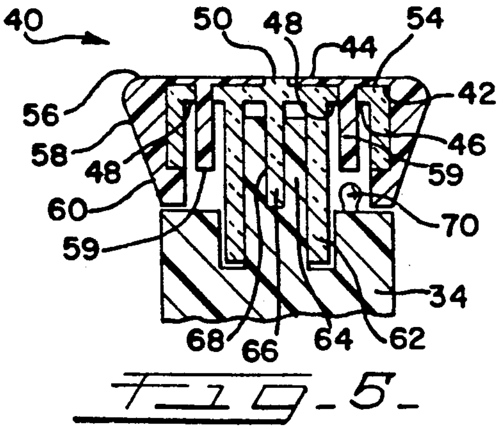
Fig-5-

BACKLIT CONTROL ACTUATOR

BACKGROUND OF THE INVENTION

The present invention relates to actuators for control devices, such as switches, and specifically to a molded actuator for use with lighted control devices to provide a backlit indication of the nature of the device.

Due to Federally-mandated safety requirements, actuators for automotive control devices, such as dashboard controls for lights, radio, heater/air conditioner, etc. have been designed to have a soft, impact absorbing outer boot. Also, for safety as well as aesthetic reasons, current automotive dashboard styling trends favor controls which are substantially flush with the surface of the dashboard or steering wheel horn pad, and which are preferably molded in the same color and thermoplastic material as the dashboard.

A drawback of conventional dashboard control actuators relates to the fact that when nighttime visibility is desired, some sort of backlit actuator has been provided to be used with a switch or control having an internal source of illumination. Conventional backlit actuators are molded of relatively rigid, opaque materials and are provided with an opening which accommodates an insert of translucent material. The insert is fastened in the opening by adhesive or similar means, and an applique bearing a cutout or white symbol indicating the function of the switch, i.e., a light bulb to indicate the light switch, is secured to the outer surface of the insert. Consequently, light emitted by the control device will backlight the symbol. The requirement of rigid actuator material often makes it difficult to match the color, texture and/or durometer value of the surrounding dashboard padding material. As such, conventional backlit control actuators do not have the energy absorbing characteristics of the surrounding dashboard, and often "stand out" aesthetically from the rest of the dashboard, which makes them less desirable from a styling standpoint.

Another disadvantage of conventional control actuators is that for those actuators which are made of a relatively softer material to match the surrounding dashboard, backlighting has not been commercially feasible.

Thus, there is a need for a backlit control actuator provided with a boot or outer covering which is relatively soft, and which may be molded to have specified durometer and color characteristics.

SUMMARY OF THE INVENTION

Accordingly, the present backlit control actuator includes a relatively soft outer boot which is molded around a translucent substrate to provide backlit capability and may be manufactured in various shapes, materials and colors. More specifically, the substrate is made of translucent material and has a front surface with a three-dimensional symbol integrally formed thereon. The boot is made of opaque, relatively soft material, and is molded around the substrate so that an upper surface of the symbol is flush with an outer surface of the boot. Thus, light transmitted from the control device is passed through the symbol to backlight the actuator. The substrate is preferably configured to provide a rigid backing for the boot and to operationally engage the control device.

BRIEF DESCRIPTION OF THE DRAWINGS

FIG. 1 is a top perspective elevational view of a control actuator incorporating the present invention;

FIG. 2 is an exploded top perspective elevational view of the actuator of FIG. 1;

FIG. 3 is a sectional view taken generally along the line 3—3 of FIG. 1 and in the direction generally indicated;

FIG. 4 is a top perspective elevational view of an alternate embodiment of the present control actuator; and FIG. 5 is a sectional view taken generally along the line 5—5 of FIG. 4 and in the direction generally indicated.

DESCRIPTION OF THE PREFERRED EMBODIMENT

Referring now to FIGS. 1-3, the backlit control actuator of the invention is generally indicated at 10. The actuator 10 includes a substrate 12 having an outer surface 14, an inner surface 16 and at least one mounting aperture 18. The outer surface 14 is provided with an integrally formed three-dimensional graphic symbol 20 which is configured to convey information to the user regarding the function which that particular actuator operates. In the illustrated embodiment, the symbol 20 relates to the rear window defogger of an automobile.

The substrate 12 is preferably formed of injection molded plastic material having translucent properties and a relatively high melting point temperature. Examples of suitable materials include polycarbonate, acrylic, and ABS. A cavity for the symbol 20 may be created in a conventional molding die by burning or engraving, either by chemical or mechanical methods, or by a pantograph tool. In some cases, the outer surface 14 of the substrate may be painted white to increase the visibility of the symbol 20 during periods of non-illumination.

If desired, the actuator 10 may be provided with at least one additional substrate chip as shown at 22, which indicates whether or not the particular control is activated. The chip 22 is preferably made of a similar material as the substrate 12, and may also be made of a material having a tint in a clearly visible color such as amber, red, bright green, etc., which enables the user to differentiate the information conveyed by the chip 22 from the illumination of the symbol 20, especially during low light or night driving conditions. Depending on the application, the chip 22 may or may not be provided with a symbol 20 and is illustrated as having a generally planar, raised surface 20'.

The actuator 10 also includes an outer covering or boot 24 having an outer surface 26 with a peripheral edge 28. A skirt 30 depends from the peripheral edge 28. In the preferred embodiment, the boot 24 is configured as a rocker switch, although other shapes are contemplated, depending on the application and the nature of the control device. In addition, the boot 24 may be provided with at least one pivot boss recess 32 for engagement with a pivot boss 33 on the substrate 12, or other equivalent formations necessary for the operational attachment of the boot and the substrate 12 to a lighted control device 34, such as a switch or a potentiometer (best seen in FIG. 5). It is preferred that the substrate 12 be configured to provide a rigid backing or support for the relatively soft boot 24. In order to provide adequate support for the boot 24, the substrate 12 may also be provided in the shape of a rocker switch. In addition, the substrate 12 may be provided with additional support formations, such as an internal support wall 36. The boot 24 also includes at least one integral mounting lug 38 (best seen in FIG. 3) which matingly engages a corresponding one of the mounting apertures 18.

The boot 24 is preferably injection molded of opaque, thermoplastic material which is deformable to the touch of an operator. In this manner, the actuator 10 provides impact-absorbing properties desired for safety reasons. The hardness of the material used for the boot 24, when measured on the "Shore A" durometer (hardness) scale, ranges from 30 to 90 durometer; however, values in the range of 40 to 60 durometer are preferred. Preferred thermoplastic materials for the boot 24 which have suitable hardness characteristics include injection grade PVC formulations such as PVC; KRATON, made by Shell Chemical Corporation; TEXAN, made by Mobay Chemical Corporation; and SANTOPRENE made by Monsanto, St. Louis, Mo. The material of the boot 24 is preferably of a lower melt temperature than the material used to make the substrate 12.

Referring now to FIGS. 4 and 5, an alternate embodiment of the actuator 1 is indicated at 40. While the actuator 10 is configured for use as a rocker switch, the actuator 40 is configured as an axially rotatable knob, of the type used for automotive radio and/or heater controls. The actuator 40 includes a substrate 42 having an outer surface 44, an inner surface 46, and at least one mounting aperture 48. A three-dimensional symbol 50, in this case a linear indicator, is integrally formed on the substrate 42 and is fabricated using the same techniques as used for the symbol 20.

A boot 52 is provided for the actuator 40, and has an upper 54 which is flush with the outer surface of the symbol 50. The boot 52 also includes a peripheral edge 56 having a depending skirt 58 and at least one mounting lug 59. The boot 52 preferably is made of a material having the same durometer characteristics as the boot 24.

In FIG. 5, it will be noted that the inner surface 46 of the substrate has been expanded radially beyond the area of the symbol 50 to support the outer surface 54 and skirt 58 of the boot 52. More specifically, the substrate 42 includes an integral annular ring 60 which serves as a backing for the skirt 58. In addition, the substrate 42 is provided with a tubular keyed barrel 62 dimensioned to matingly and operationally engage a shaft 64 on the control device 34. A positive operational connection is made between a key member 66 in the barrel 62 and a slot 68 in the shaft 64. The control device 34 also has a light source 70, which may be a small bulb, an L.E.D., a fiber optic light, or any other type of low current draw illumination device. The location of the light source 70 on the control device 34 may vary depending on the type of device.

The control actuators 10 and 40 are fabricated by means of the same process, which will be described in relation to the actuator 10. The substrate is fabricated first, preferably by means of injection molding. If a chip 22 is to be included, it is then molded into the substrate 12. Next, the substrate 12 is placed in a conventional molding die (not shown) used for the production of the boot 24. The relatively soft material for the boot 24 is then injected into the die so that the boot forms around the symbol 20, and the lugs 38 are pushed through the corresponding apertures 18. Since the substrate 12 (and if included, the chip 22) is made of a material with a higher melting point than the material used for the boot 24, the substrate does not melt during the production of the boot. Care should be taken to avoid portions of the boot 24 forming around the areas of the substrate 12 directly behind and adjacent the symbol 20 or the symbol 20', for this may tend to cause shadows upon illumination of the symbols by the control device 34. If desired, and depending on the application, the substrate 12 may also be secured to the boot 24 by chemical bonding materials such as adhesives.

Thus, the present actuator, upon completion, provides a relatively soft, deformable boot having an integrally formed translucent symbol which may be readily backlit. The material for the present boot may be selected to have any desired color or texture as particular styling requirements dictate.

While a particular embodiment of the backlit control actuator of the invention has been shown and described, it will be appreciated by those skilled in the art that changes and modifications may be made thereto without departing from the invention in its broader aspects and as set forth in the following claims.

What is claimed is:

1. A backlit control actuator, comprising:

a substrate of translucent material which is sufficiently rigid to provide a support backing for a relatively softer material molded around said substrate, said substrate having a front surface with a three-dimensional symbol integrally formed thereon; and being provided with a formation for operationally engaging a switch, said symbol having an upper surface; and a boot of opaque material which is soft relative to said material of said substrate, said boot having an outer surface, a peripheral edge and a skirt depending from said peripheral edge, said boot being molded around said substrate so that said upper surface of said symbol is flush with said outer surface of said boot.

2. The actuator as defined in claim 1 wherein said boot further includes at least one integral lug which matingly engages a corresponding at least one throughbore formation on said substrate.

3. The actuator as defined in claim 2 further including a plurality of throughbore formations on said substrate and a like plurality of lug formations on said boot for matingly engaging said throughbore formations, said mating engagement being the only means of securing said substrate to said boot.

4. The actuator as defined in claim 1 wherein said substrate is secured to said boot by chemical bonding.

5. The actuator as defined in claim 1 wherein said substrate is fabricated of injection molded plastic.

6. The actuator as defined in claim 1 wherein said boot is injection molded of plastic material to be deformable to the touch of an operator.

7. The actuator as defined in claim 6 wherein said plastic material has a hardness value in the range of 30–90 durometer.

8. The actuator as defined in claim 6 wherein said plastic material has a hardness value in the range of 40–60 durometer.

9. The actuator as defined in claim 1 including first and second backlit portions, each having a distinct substrate.

10. The actuator as defined in claim 9 wherein said substrate of said first backlit portion is of a different color than said second substrate.

11. The actuator as defined in claim 1 further including an additional symbol on said substrate, and said substrate having an underside configured to accept at least two light sources, so that each of said symbols is illuminated independently.

12. A method of fabricating a backlit control actuator for a lighted control device, comprising:

providing a relatively rigid substrate portion of translucent material having an outer surface with a three-dimensional symbol thereon, and also having a formation for operationally engaging a switch, said symbol having an upper surface;

placing said substrate in a plastic molding apparatus; and molding an opaque boot around said substrate, said boot having an outer surface, a peripheral edge and a skirt depending from said peripheral edge, and being soft relative to said substrate material, so that said outer surface of said boot is flush with said upper surface of said symbol.

13. A backlit control actuator, comprising:

a substrate of translucent material having a front surface with a three-dimensional symbol integrally formed thereon, said substrate having at least one throughbore formation, said symbol having an upper surface;

a boot of opaque, relatively soft material which has an outer surface, a peripheral edge and a skirt depending from said peripheral edge; and said boot being molded around said substrate so that said upper surface of said symbol is flush with said outer surface of said boot and having at least one integral lug which matingly engages at least one of said corresponding throughbore formations on said substrate.

14. The actuator as defined in claim 13 further including a plurality of throughbore formations on said substrate and a like plurality of lug formations on said boot for matingly engaging said throughbore formations, said mating engagement being the only means of securing said substrate to said boot.

* * * * *